United States Patent
Furukawa et al.

(12) 
(10) Patent No.: US 10,293,829 B2
(45) Date of Patent: May 21, 2019

(54) ROAD SURFACE SUBMERGENCE ESTIMATION DEVICE

(71) Applicant: TOYOTA JIDOSHA KABUSHIKI KAISHA, Toyota-shi, Aichi-ken (JP)

(72) Inventors: Daisuke Furukawa, Fujimino (JP); Takuji Yamada, Musahino (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 209 days.

(21) Appl. No.: 15/209,252

(22) Filed: Jul. 13, 2016

(65) Prior Publication Data

US 2017/0015329 A1 Jan. 19, 2017

(30) Foreign Application Priority Data

Jul. 16, 2015 (JP) ................................ 2015-142203

(51) Int. Cl.

| B60W 40/06 | (2012.01) |
| B60K 35/00 | (2006.01) |
| B60Q 9/00 | (2006.01) |
| G01C 21/34 | (2006.01) |
| G01P 13/00 | (2006.01) |
| B60W 50/00 | (2006.01) |

(52) U.S. Cl.

CPC ............ *B60W 40/06* (2013.01); *B60K 35/00* (2013.01); *B60Q 9/00* (2013.01); *G01C 21/3415* (2013.01); *G01P 13/00* (2013.01); *B60W 2050/0031* (2013.01); *B60W 2510/105* (2013.01); *B60W 2520/105* (2013.01)

(58) Field of Classification Search
None
See application file for complete search history.

(56) References Cited

U.S. PATENT DOCUMENTS

| 6,434,472 | B1 * | 8/2002 | Minowa | ............. | B60K 31/0008 |
| | | | | | 477/115 |
| 2001/0014845 | A1 * | 8/2001 | Minowa | ................. | A61B 3/032 |
| | | | | | 701/84 |
| 2009/0105921 | A1 * | 4/2009 | Hanatsuka | ......... | B60G 17/0165 |
| | | | | | 701/80 |
| 2009/0216415 | A1 | 8/2009 | Iwatsuki et al. | | |

(Continued)

FOREIGN PATENT DOCUMENTS

| JP | 2009-35067 A | 2/2009 |
| JP | 2012-216103 A | 11/2012 |

(Continued)

*Primary Examiner* — James M McPherson
(74) *Attorney, Agent, or Firm* — Sughrue Mion, PLLC (57) ABSTRACT

A road surface submergence estimation device including a motion sensor that acquires an actual acceleration of a vehicle; a torque acquisition sensor that acquires an actual torque transmitted from a driving source to wheels of the vehicle, the driving source being mounted in the vehicle; and an estimation processor that estimates that a road surface on which the vehicle is traveling is submerged when it is determined that a submergence determination condition is satisfied. The road surface submergence estimation device may also include a wireless communication device configured to either send submergence information to a central server, or receive additional submergence information from a central server.

10 Claims, 7 Drawing Sheets

(56) References Cited

U.S. PATENT DOCUMENTS

2014/0195118 A1* 7/2014 Okubo ..................... B60T 8/00
 701/41
2018/0215381 A1* 8/2018 Owen ................. B60W 30/143

FOREIGN PATENT DOCUMENTS

| JP | 2013-025396 A | 2/2013 |
| WO | 2007/088859 A1 | 8/2007 |
| WO | 2014/027111 A1 | 2/2014 |

* cited by examiner

FIG. 7

ROAD SURFACE SUBMERGENCE ESTIMATION DEVICE

CROSS-REFERENCE TO RELATED APPLICATIONS

The disclosure of Japanese Patent Application No. 2015-142203 filed on Jul. 16, 2015 including the specification, drawings and abstract is incorporated herein by reference in its entirety.

BACKGROUND

1. Technical Field

This disclosure relates to a road surface submergence estimation device that estimates whether the surface of a road, on which a vehicle is traveling, is submerged based on the actual acceleration of the vehicle.

2. Description of Related Art

A road surface (a part of the road) is sometimes submerged with a large amount of rainfall or an inflow of rainwater that falls at other sites. When a vehicle enters a submerged road surface (submerged road), there may be slippage between the wheels of the vehicle and the road surface, or that the engine mounted in the vehicle could stop. To address this problem, a submerged road prediction system is known (for example, see Japanese Patent Application Publication No. 2012-216103 (JP 2012-216103 A)). When a submerged road is included in the traveling route of a vehicle, this system presents the information on a detour to the driver of the vehicle, via the navigation device installed in the vehicle interior, to prompt the driver to travel on a non-submerged road surface (non-submerged road).

A vehicle that uses this submerged road prediction system (hereinafter also called a "system according to the related art") estimates the amount of precipitation at the position where the vehicle is traveling based on the wiping speed of the wiper on the vehicle and the length of time during which the wiper operates at that speed. In addition, this vehicle sends the estimated amount of precipitation, as well as the position information on the vehicle, to a plurality of other vehicles. At the same time, from each of a plurality of other vehicles, this vehicle receives the estimated amount of precipitation as well as the position information on a vehicle that has sent the estimated amount of precipitation. Each of the vehicles, which use the system according to the related art, determines whether there is a submerged part on the traveling route of the vehicle based on the estimated amounts of precipitation received from the other vehicles traveling ahead on the traveling route.

However, even if the amount of precipitation is the same, the wiping speed of the wiper differs according to the drivers in many cases. In addition, even if the same driver drives the vehicle, the wiping speed of the wiper differs according to the vehicle-driving time zones in many cases. For example, when driving at night, the driver tends to increase the wiping speed of the wiper than when driving at daytime, during which the road surface and the other vehicles can be confirmed easier than at night, even if the amount of precipitation is the same. This means that the amount of precipitation, if estimated based on the wiping speed of the wiper, may include a large error.

In addition, even when the amount of precipitation is small, the surface of a depressed road, such as a road under an overhead crossing or a road under a railroad track, is submerged more easily than the surface of a flat road. Therefore, even if the amount of precipitation can be estimated, it is usually difficult to estimate whether the surface of the road at that point is submerged. Thus, with the system according to the related art, it is difficult to estimate accurately whether the road surface is submerged.

SUMMARY

This disclosure provides a "road surface submergence estimation device" that estimates whether the surface of the road, on which a vehicle is traveling, is submerged.

A road surface submergence estimation device according to an aspect of t this disclosure may include: an acceleration acquisition sensor configured to acquire an actual acceleration of a vehicle; a torque acquisition sensor configured to acquire an actual torque transmitted from a driving source to wheels of the vehicle, the driving source being mounted on the vehicle; and an estimation processor that is configured to determine whether a predetermined submergence determination condition is satisfied using the actual acceleration and the actual torque and, when it is determined that the submergence determination condition is satisfied, estimates that a road surface on which the vehicle is traveling is submerged. The estimation processor is also configured to determine that the submergence determination condition is satisfied at least when a first condition that a first parameter is larger than a first threshold is satisfied. The first parameter is a parameter that becomes larger as a difference between a first variable and a second variable becomes larger. The first variable is a variable that becomes larger as the actual acceleration becomes larger. The second variable is a variable that becomes larger as an actual torque becomes larger.

In the aspect described above, the first variable may be the actual acceleration and the second variable may be a theoretical acceleration that is an acceleration of the vehicle when the vehicle is traveling on a non-submerged, flat road surface, the theoretical acceleration being calculated based on the actual torque.

When the road surface on which the vehicle is traveling is a non-submerged, flat road surface (hereinafter called a "dry road" or a "non-submerged road"), the actual acceleration of the vehicle becomes larger as the torque (real torque) transmitted from the driving source (for example, the engine and/or the motor), mounted on the vehicle, to the wheels becomes larger. However, when the vehicle travels on a submerged road, the water, gathered on the road surface, resists the rotation and movement of the wheels (that is, the traveling of the vehicle). Therefore, even if the real torque is the same between when the vehicle travels on a submerged road and when the vehicle travels on a dry road, the acceleration of the vehicle when the vehicle travels on the submerged road is less than the acceleration when the vehicle travels on the dry road. That is, when the vehicle travels on a submerged road, a relatively large difference is generated between the theoretical acceleration and the real acceleration due to the water resistance.

Therefore, the estimation processor of the submergence estimation device in the aspect of t this disclosure is further configured to calculate the theoretical acceleration, which is the acceleration of the vehicle when the vehicle is traveling on a non-submerged, flat road surface, based on the acquired actual torque, to calculate the first parameter that becomes larger as the difference between the theoretical acceleration and the actual acceleration is larger, and to determine that the submergence determination condition is satisfied at least if the first condition that the first parameter is larger than a predetermined first threshold is satisfied.

As a result, the submergence estimation device according to the aspect of this disclosure can accurately estimate whether the road surface on which the vehicle is traveling is submerged using the first parameter that becomes larger as the difference between the theoretical acceleration and the real accelerations becomes larger.

In the aspect described above, the first parameter may be an acceleration difference value that is a difference between the theoretical acceleration and the actual acceleration.

Figure 2:
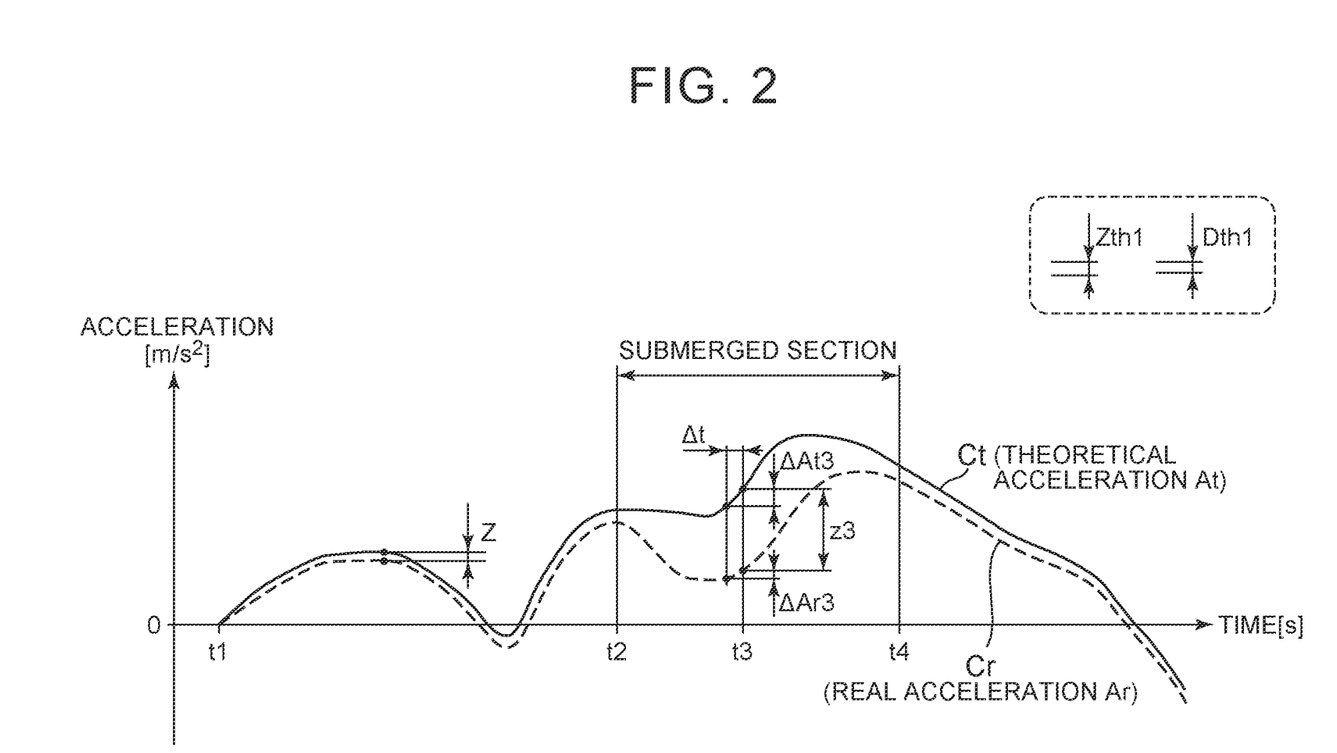
FIG. 2 is a timing diagram showing a change over time in the theoretical acceleration and the real acceleration.

For example, when the vehicle starts traveling on a submerged road at time t2, the real acceleration Ar indicated by the curve Cr is decreased due to the water resistance as shown in FIG. 2 with the result that the first parameter, which is the difference (acceleration difference value) between the theoretical acceleration and the real acceleration, becomes larger. Therefore, this first parameter can be used to accurately estimate whether the road surface on which the vehicle is traveling is submerged.

In the aspect described above, the first parameter may be a product of a variance of acceleration difference values in a first predetermined duration and a current-time value of the acceleration difference value. The acceleration difference value may be a difference between the theoretical acceleration and the actual acceleration.

For example, when the vehicle travels over a bump or a manhole cover, or travels in a small puddle, on the road surface, the real acceleration temporarily changes and, as a result, the acceleration difference value temporarily increases or decreases. However, the increase or decrease in the acceleration difference value in such a case is temporary, meaning that the variance of acceleration difference values in a predetermined duration is relatively small. Therefore, the first parameter calculated in such a case as the product of the variance of acceleration difference values in a predetermined duration and the current-time value of the acceleration difference value is relatively small even if the current-time value of the acceleration difference value is large.

On the other hand, because the acceleration difference value is rapidly increased when the vehicle starts to travel on a submerged road, the variance of acceleration difference values in the predetermined duration becomes large. Therefore, when the vehicle starts to travel on a submerged road, the first parameter calculated as the product of the variance of acceleration difference values in the predetermined duration and the current-time value of the acceleration difference value becomes a relatively large value. Thus, according to the aspect described above, it is possible to reduce the possibility that the road surface is erroneously determined submerged when there is a temporary change in the road surface condition.

In the aspect described above, the estimation processor may be configured to determine that the submergence determination condition is satisfied when the first condition and a second condition that a second parameter is larger than a predetermined second threshold are satisfied. The second parameter may be a parameter that becomes larger as a difference between an amount of change in the theoretical acceleration per predetermined time and an amount of change in the actual acceleration per the predetermined time becomes larger.

For example, when the vehicle is traveling on an uphill road (that is, climbing an uphill road), the force (gravitational resistance) in the direction opposite to the traveling direction of the vehicle is applied to the vehicle due to gravity. Therefore, the acceleration difference value may be increased in this case not only by the water resistance but also by the gravitational resistance. This means that, when the acceleration difference value is large, it cannot be determined which, either submergence of the road surface or a slope in the road surface, is the reason for an increase in the acceleration difference value.

In the meanwhile, the magnitude of water resistance is proportional to the front projection area that is the area of a submerged part of the vehicle (more specifically, the wheels) when the vehicle is viewed from the front of the traveling direction and, in addition, proportional to the square of the difference in the speed (more specifically, vehicle speed) between the water gathered on the road surface and the vehicle. Therefore, the water resistance becomes higher as the depth of water on a submerged road is larger because, in this case, the front projection area becomes larger. In addition, the water resistance becomes higher as the vehicle speed is higher.

Therefore, when the real torque is increased while the vehicle is traveling on a submerged road (that is, when the theoretical acceleration is increased), the vehicle speed is increased and, as the vehicle speed becomes higher, the water resistance is rapidly increased. Therefore, the amount of increase in the real acceleration becomes smaller than the amount of increase in the theoretical acceleration. That is, in this case, the second parameter that becomes larger as the difference between the amount change in the theoretical acceleration per predetermined time and the amount of change in the actual acceleration per the predetermined time becomes larger is increased.

On the other hand, the gravitational resistance is proportional to the total weight of the vehicle and is increased as the slope of an uphill road (angle of slope) becomes larger. However, the gravitational resistance does not change when the vehicle speed changes. Therefore, if the theoretical acceleration is increased while the vehicle is traveling on an inclined, dry road, the difference between the theoretical acceleration and the real acceleration does not change. That is, in this case, the second parameter does not change.

As described above, according to one of the aspects described above, the second parameter can be used to reduce the possibility that the road surface is erroneously estimated to be submerged surface while the vehicle is traveling on a non-submerged, uphill road.

In the aspect described above, the second parameter may be a difference between an amount of change in the theoretical acceleration per the predetermined time and an amount of change in the actual acceleration of the vehicle per the predetermined time.

This configuration allows the second parameter to be calculated simply.

In addition, in the aspect described above, the second parameter may be a variance of differences, in a second predetermined duration, between an amount of change in the theoretical acceleration per the predetermined time and an amount of change in the actual acceleration of the vehicle per the predetermined time.

When the vehicle starts traveling on a submerged road, the amount of change in the actual acceleration per predetermined time becomes small with the result that the difference between the amount of change in the theoretical acceleration per predetermined time and the amount of change in the actual acceleration of the vehicle per the predetermined time is increased rapidly. Therefore, the variance of the differences becomes relatively large. On the other hand, when the road surface condition temporarily changes, for example when the vehicle travels in a small puddle or travels over a manhole cover, the change in the actual acceleration is temporary and, therefore, the difference between the amount of change in the theoretical acceleration per predetermined time and the amount of change in the actual acceleration of the vehicle per the predetermined time is relatively small. Therefore, according to the aspect described above, it is possible to reduce the possibility that the road surface is erroneously determined submerged when there is a temporary change in the road surface condition.

The other aspects of the disclosure include a vehicle on which the road surface submergence estimation device described above is mounted, a method used by the road surface submergence estimation device described above, and a system that includes a vehicle on which the road surface submergence estimation device described above is mounted. The other purposes, features, and accompanying advantages will be easily understood from the description of the embodiments in this disclosure described with reference to the following drawings.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A road surface submergence estimation device in a first embodiment (hereinafter also called a "first estimation device") is described below with reference to the drawings. The first estimation device is an estimation device that estimates a submergence point on a road. The first estimation device is implemented by an information providing device 21 mounted on a vehicle 10 shown in FIG. 1. The vehicle 10 has an internal combustion engine (engine) mounted therein as the driving source. It should be noted that the vehicle 10 may be a hybrid vehicle that has both "an engine and a motor" mounted therein as the driving source, or may be an electric vehicle that has a "motor" mounted therein as the driving source.

Figure 1:
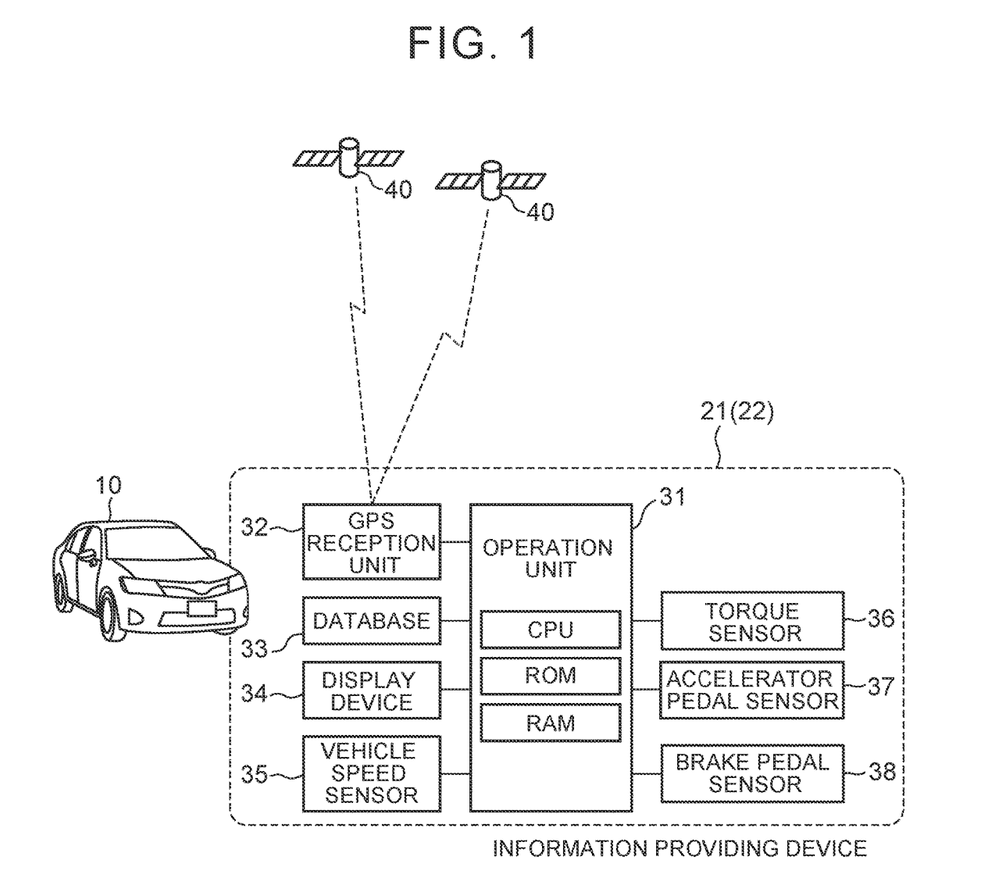
FIG. 1 is a diagram showing the outline of an information providing device that operates as a road surface submergence estimation device (first estimation device) in a first embodiment.

The information providing device 21 includes an operation unit 31, a GPS reception unit 32, a database 33, a display device 34, a vehicle speed sensor 35, a torque sensor 36, an accelerator pedal sensor 37, and a brake pedal sensor 38. The information providing device 21 may also include a wireless communication device, not shown, for communicating with external units, or uploading or downloading additional information. The operation unit 31 is an electronic circuit that includes a known microcomputer. The operation unit 31 includes a CPU, a ROM in which programs for execution by the CPU and a map (lookup table) are stored, and a RAM in which data is stored temporarily.

The GPS reception unit 32 acquires the current position Ps of the vehicle 10 based on the signal (radio wave) from a Global Positioning System (GPS) satellite 40, and outputs the signal, which indicates the current position Ps, to the operation unit 31. The database (DB) 33 stores a map database. The map database includes the information (map information) on nodes such as intersections and dead ends, roads each of which connects nodes, and facilities such as a building or a parking lot along a road. The database 33 is configured by a storage medium such as a hard disk drive (HDD) or a flash memory. The information providing device 21 may acquire the map information and the suggested-route information, which will be described later, from an external center using a wireless communication device not shown.

The display device 34 may be arranged on a center console, not shown, provided in the vehicle interior of the vehicle 10. Alternatively, the display device can be located on other parts of the vehicle interior such as behind the steering wheel or even as a heads-up display on the windshield. The display device 34, when operated by the driver of the vehicle 10, can display the map information stored in the database 33, as well as the current position Ps. In addition, the display device 34 may include a sound device not shown. The display device 34 may include a sound device so that it can generate a warning sound or a message in response to an instruction from the operation unit 31.

The vehicle speed sensor 35 detects the rotation speed of the axle (not shown) of the vehicle 10 and outputs the signal, which indicates the traveling speed (vehicle speed) Vs of the vehicle 10, to the operation unit 31. The operation unit 31 differentiates the vehicle speed Vs with respect to time to acquire the actual acceleration (real acceleration) Ar (=dVs/dt) of the vehicle 10. The torque sensor 36, provided on the axle (not shown), outputs the signal, which indicates the actual torque (real torque) Tq, to the operation unit 31. The actual torque Tq is generated by the engine (driving source), mounted on the vehicle 10, and is transmitted to the axle via the power train (transmission, drive shaft, and differential gear).

The accelerator pedal sensor 37 outputs the signal, which indicates the accelerator pedal operation amount Acp, to the operation unit 31. The accelerator pedal operation amount Acp is the depression amount of the accelerator pedal, not shown, operated by the driver of the vehicle 10. The brake pedal sensor 38 outputs the signal, which indicates the brake pedal operation amount Bkp, to the operation unit 31. The brake pedal operation amount Bkp is the depression amount of the brake pedal, not shown, operated by the driver of the vehicle 10.

Next, the outline of the road surface submergence estimation processing performed by the operation unit 31 of the information providing device 21 is described with reference to the timing diagram shown in FIG. 2. FIG. 2 shows a change over time in the theoretical acceleration At and the real acceleration Ar when the vehicle 10 travels on a flat road surface. The theoretical acceleration At will be described later. The timing diagram in FIG. 2 shows an example in which the vehicle 10 starts traveling on a dry road at time t1, travels on a submerged road for the period from time t2 to time t4, and travels again on a dry road after time t4. The theoretical acceleration At and the real acceleration Ar are shown, respectively, by the curve Ct and the curve Cr.

Like a known navigation system, the operation unit 31 displays a route (suggested route) to the destination that is set by the operation of the driver of the vehicle 10, as well as the current position Ps, on the display device 34. In addition, the operation unit 31 may guide the driver along the route via voice generated from the sound device on the display device 34.

In addition, the operation unit 31 estimates whether the current position Ps is submerged. More specifically, the operation unit 31 generates the traveling data Dtr each time a predetermined time Δt elapses (10 milliseconds in this example) and stores the generated traveling data Dtr, as well as the data ID, into the RAM. The traveling data Dtr includes data on the current position Ps, real torque Tq, vehicle speed Vs, real acceleration Ar, accelerator pedal operation amount Acp, and brake pedal operation amount Bkp. The data ID is a numeric value incremented by 1 each time the traveling data Dtr is generated.

In the description below, the data ID corresponding to the latest traveling data Dtr, generated by the operation unit 31, is denoted as "i" unless otherwise specified. In addition, the traveling data Dtr corresponding to the data ID=i is denoted as Dtr(i). Similarly, in some cases, each of the data elements included in the traveling data Dtr is denoted by adding a parenthesized data ID after the data element (for example, Tq(i) and real acceleration Ar(i)).

The operation unit 31 calculates the theoretical acceleration At that is the acceleration of the vehicle 10 when it is assumed that the vehicle 10 is traveling on a flat (with no slope) dry road. More specifically, the operation unit 31 calculates the theoretical acceleration At(i), corresponding to the data ID=i, based on expression (1) given below.

$$At(i)=Tq(i)/(M\times r) \quad (1)$$

where, M is the weight coefficient that has a correlation with the total weight m that includes weight of the occupants and the load of the vehicle 10, and r is the radius of the wheels of the vehicle 10.

While the vehicle 10 is stationary, the operation unit 31 acquires the weight m0 of the above-spring members, including the occupants and the load, by means of a known method based on the vehicle height measured by the vehicle-height sensor not shown. In addition, based on the weight m0 and the wheel weight stored in advance in the ROM, the operation unit 31 further calculates the weight coefficient M. Furthermore, the operation unit 31 stores the radius r of the wheels in the ROM in advance.

In addition, because the vehicle 10 is less likely to start traveling on a submerged road immediately after the engine is started, the operation unit 31 may calculate the weight coefficient M, using expression (2) given below, immediately after the vehicle 10 starts traveling and store the calculated weight coefficient M in the RAM.

$$M=Tq(i)/(Ar(i)\times r) \quad (2)$$

In addition, the operation unit 31 calculates the acceleration difference value Z that is the difference between the theoretical acceleration At and the real acceleration Ar. This acceleration difference value Z is used also to determine whether the vehicle 10 is traveling on a submerged road. More specifically, the operation unit 31 calculates the acceleration difference value Z(i) corresponding to data ID=i based on expression (3) given below. For convenience, the acceleration difference value Z is also called also a first parameter.

$$Z(i)=At(i)-Ar(i) \quad (3)$$

As understood from FIG. 2, the acceleration difference value Z becomes a small value (approximately "0") in the period from time t1 to time t2 during which the vehicle 10 travels on the dry road. However, after time t2 at which the vehicle 10 enters the submerged road, the acceleration difference value Z is rapidly increased. Therefore, if the acceleration difference value Z exceeds the threshold, it can be determined that the vehicle 10 is likely to be traveling on the submerged road. The acceleration difference value Z is increased in this way because the vehicle 10 enters the submerged road at time t2 and, in addition, the water depth continues to increase until time t3 with the result that the water resistance Fw on the wheels of the vehicle 10 is increased.

Therefore, the operation unit 31 can determine that the vehicle 10 is traveling on the submerged road at least if the condition that the acceleration difference value Z(i) is larger than the predetermined threshold Zth1 is satisfied.

Actually, however, when the vehicle 10 starts traveling on an uphill road (starts climbing an uphill road), the real acceleration Ar is decreased due to the gravitational acceleration. As a result, the acceleration difference value Z(i) is increased, sometimes making it difficult to determine whether the vehicle 10 is traveling on a submerged road or traveling on an uphill road.

To distinguish between them, the operation unit 31 calculates the acceleration change difference value D, which is the difference between the amount of change in the theoretical acceleration At per predetermined time Δt and the amount of change in the real acceleration Ar per predetermined time Δt. More specifically, the operation unit 31 calculates the acceleration change difference value D(i), corresponding to the data ID=i, based on expression (4) given below. For convenience, the acceleration change difference value D is called a second parameter.

$$D(i)=(At(i)-At(i-1))-(Ar(i)-Ar(i-1)) \quad (4)$$

To calculate the difference D0 between the amount of change in the theoretical acceleration At per unit time and the amount of change in the real acceleration Ar per unit time, the first term and the second term on the right-hand side of expression (4) are divided by the predetermined time Δt. That is, D0=D(i)/Δt.

The acceleration change difference value D can be used to distinguish between traveling on an uphill road and traveling on a submerged road because of the following reason.

After time t2, the real acceleration Ar is decreased due to the water resistance Fw. Therefore, to maintain the real acceleration Ar, the driver of the vehicle 10 increases the accelerator pedal operation amount Acp immediately before time t3. As a result, the real torque Tq is increased and the theoretical acceleration At is increased and, accordingly, the real acceleration Ar is increased after time t3.

The acceleration change difference value D at time t3 (hereinafter called "acceleration change difference value d3") is calculated using expression (5) given below.

$$d3=(\Delta At3-\Delta Ar3) \quad (5)$$

where, ΔAt3 is the amount of change in the theoretical acceleration At from the time (t3−Δt) to the time t3, and ΔAr3 is the amount of change in real acceleration Ar from the time (t3−Δt) to the time t3.

The acceleration change difference value d3 is the acceleration change difference value D corresponding to the time when the driver of the vehicle 10 increases the theoretical acceleration At and, accordingly, the real acceleration Ar begins to increase. The acceleration change difference value d3 is larger than 0 because ΔAt3−ΔAr3>0 as understood from FIG. 2.

That is, at time t3, the change rate of the theoretical acceleration At (amount of change in the theoretical acceleration At per predetermined time Δt) is larger than the change rate of the real acceleration Ar (amount of change in the real acceleration Ar per predetermined time Δt). The difference between these change rates is generated due to the fact that the higher the vehicle speed Vs is, the larger the water resistance Fw is.

The water resistance Fw can be calculated based on expression (6) given below.

$$Fw = \tfrac{1}{2} \times \rho \times Vs^2 \times S \times Cd \qquad (6)$$

where, ρ is the water density, S is the area (front projection area) of the submerged part of the wheels of the vehicle 10 when viewed from the traveling direction, and Cd is a predetermined coefficient (resistance coefficient). As understood from expression (6), the water resistance Fw is proportional to the square of the vehicle speed Vs.

On the other hand, when the vehicle 10 is traveling on an uphill road, the gravity resistance Fg, which is the force in the direction opposite to the traveling direction of the vehicle 10, is applied to the vehicle 10 because of gravity. The gravity resistance Fg can be calculated based on expression (7) given below.

$$Fg = m \times g \times \sin\theta \qquad (7)$$

where, m is the total weight that includes the weight of the occupants and the load of the vehicle 10, g is the weight acceleration, and θ is the inclination angle of the uphill road.

As understood from expression (7), the gravity resistance Fg does not change even if the vehicle speed Vs changes. Therefore, when the gravity resistance Fg is applied, but the water resistance Fw is not applied, to the vehicle 10, the change rate of the theoretical acceleration At and the change rate of the real acceleration Ar are approximately equal. Therefore, the acceleration change difference value D is approximately 0.

From the above description, it is estimated that, when the acceleration change difference value D is a positive value, the water resistance Fw is applied to the vehicle 10.

Therefore, the operation unit 31 estimates or determines whether the current position Ps is submerged (whether the vehicle 10 is currently traveling on a submerged road) based on the acceleration difference value Z and the acceleration change difference value D. It should be noted, however, that when a braking force including the so-called engine brake is applied to the vehicle 10, the acceleration difference value Z and the acceleration change difference value D change according to the factors other than the water resistance Fw and the gravity resistance Fg (that is, according to the braking force). Therefore, when the braking force is applied to the vehicle 10, the operation unit 31 does not determine whether the current position Ps is submerged (in the description below, this determination is sometimes called simply as "submergence determination"). The actual condition the operation unit 31 uses for submergence determination is also called a "submergence determination condition".

The submergence determination condition used by the first estimation device is a condition that is satisfied if all conditions below are satisfied. Among those conditions, the condition (B1) below may be omitted. (A1) The acceleration difference value Z(i) is larger than the predetermined threshold Zth1 (that is, Z(i)>Zth1). (B1) The acceleration change difference value D(i) is larger than the predetermined threshold Dth1 (that is, D(i)>Dth1). (C) The vehicle 10 is traveling ahead and is accelerating.

The condition (C) is a condition that is satisfied if all conditions below are satisfied. (c1) The vehicle speed Vs is higher than 0 (that is, Vs>0). (c2) The accelerator pedal operation amount Acp is larger than 0 (that is Acp>0). (c3) The brake pedal operation amount Bkp is 0 (that is, Bkp=0). (c4) The real torque Tq is a positive value (that is, Tq(i)>0). (c5) The real torque q is increasing (that is, Tq(i)−Tq(i−1)> 0). In FIG. 2, the lengths on the graph corresponding to the threshold Zth1 and the threshold Dth1 are shown.

Next, the specific operation of the CPU of the operation unit 31 during the execution of the submergence determination processing is described below with reference to the "submergence determination processing routine" shown in the flowchart in FIG. 3. The CPU performs this routine each time the predetermined time Δt elapses.

That is, at an appropriate time, the CPU starts the processing at step 300 and proceeds to step 305 to acquire the traveling data Dtr(i) of the data ID=i (that is, Ps(i), Tq(i), Vs(i), Acp(i), and Bkp(i)). In this step, the CPU calculates the change amount dVs (=Vs(i)−Vs(i−1)) of the vehicle speed Vs(i) during a predetermined time Δt and, by dividing the resulting value by the predetermined time Δt, acquires the actual acceleration (real acceleration) Ar(i) (=dVs/Δt) of the vehicle 10. Next, the CPU proceeds to step 310 to determine whether the current position Ps(i) is a position to be checked for submergence.

For example, if the road on which the vehicle 10 is traveling is unpaved, it is difficult to accurately estimate whether the road is submerged based on the submergence determination condition described above. Therefore, using the data indicating whether the road on which the vehicle 10 is traveling is unpaved, the CPU determines whether the current position Ps(i) is a position to be checked for submergence. If it is determined that the road on which the vehicle 10 is traveling is unpaved, the CPU determines that the result of step 310 is No, proceeds directly to step 395, and once terminates the routine. That is, the submergence determination processing is not performed while the vehicle is traveling on an unpaved road.

If the current position Ps(i) is a position to be checked for submergence, the CPU determines that the result of step 310 is Yes and proceeds to step 315. In step 315, the CPU calculates the theoretical acceleration At(i), acceleration difference value Z(i), and acceleration change difference value D(i) according to expressions (1), (3), and (4), respectively. Next, the CPU proceeds to step 320 to determine whether the submergence determination condition described above is satisfied.

If the submergence determination condition is satisfied, the CPU determines (estimates) that the current position Ps(i) is submerged and proceeds from step 320 to step 325 to perform the following submergence-time processing. (1) The CPU causes the display device 34 to display that the road surface on which the vehicle is traveling is submerged. (2) The CPU may cause the display device 34 to generate a warning sound and/or a message indicating that the road surface on which the vehicle is traveling is submerged. (3) The CPU stores the fact that the current position Ps(i) is submerged, as well as the date and time, in the database 33. After that, the CPU proceeds to step 395 to once terminate the routine.

On the other hand, if it is determined in step 320 that the submergence determination condition is not satisfied, the CPU determines in step 320 that the result is No and proceeds to step 330 to perform the following non-submergence-time processing. (1) If the information indicating that the road surface, on which the vehicle is traveling, is submerged is displayed on the display device 34, the CPU erases that display. (2) If the warning and/or message indicating that the road surface, on which the vehicle is traveling, is submerged is generated on the display device 34, the CPU stops the generation of the warning sound and/or message. After that, the CPU proceeds to step 395 to once terminate the routine.

As described above, the first estimation device (information providing device 21) includes an acceleration acquisition unit (vehicle speed sensor 35 and step 305) that acquires the actual acceleration (Ar(i)) of the vehicle (10); a torque acquisition unit (torque sensor 36 and step 305) that acquires the actual torque (real torque Tq(i)) transmitted from the driving source (engine) mounted on the vehicle (10) to the wheels of the vehicle; and an estimation processor (step 320 and step 325) that uses the acquired actual acceleration (Ar(i)) and the acquired actual torque (Tq(i)) to determine whether the predetermined submergence determination condition is satisfied (step 315 and step 320) and, if the submergence determination condition is satisfied, estimates that the road surface, on which the vehicle is traveling, is submerged.

In addition, the estimation processor calculates the theoretical acceleration (At(i)) (step 315), which is the acceleration of the vehicle when the vehicle is traveling on a non-submerged, flat road surface, based on the acquired actual torque (Tq(i)) and calculates the first parameter (acceleration difference value Z(i)) that becomes larger as the difference between the theoretical acceleration (At(i)) and the actual acceleration (Ar(i)) becomes larger. At least if the first condition that the first parameter is larger than the predetermined first threshold (Zth1) is satisfied (see submergence determination condition (A1)), the estimation processor determines that the submergence determination condition is satisfied (step 320 to step 330).

In addition to the first condition, the estimation processor calculates the second parameter (acceleration change difference value D(i)) that becomes larger as the difference between the amount of change in the theoretical acceleration per predetermined time ($\Delta t$) (At(i)−At(i−1)) and the amount of change in the actual acceleration per predetermined time (Ar(i)−Ar(i−1)) becomes larger. If the second condition that the second parameter is larger than the predetermined second threshold (Dth1) is satisfied (see submergence determination condition (B1)), the estimation processor determines that the submergence determination condition is satisfied (step 320 to step 330).

Therefore, the first estimation device determines whether the vehicle 10 is traveling on a submerged road surface based on the acceleration difference value Z(i) that is the first parameter. As a result, as compared with the conventional system that determines whether the road surface is submerged based on the wiper operation speed, the first estimation device can determine more accurately whether the vehicle 10 is traveling on a submerged road.

In addition, the first estimation processor determines whether the vehicle 10 is traveling on a submerged road surface based on the acceleration change difference value D(i) that is the second parameter. As a result, the first estimation device can reduce the possibility that the road surface is erroneously determined as a submerged road surface while traveling on an uphill road.

In the first embodiment described above, the first estimation device determines whether the road is submerged, using the actual acceleration (real acceleration) Ar, acquired by differentiating the vehicle speed Vs with respect to time, and the theoretical acceleration At(i), of the vehicle 10. The acceleration may be acquired as a change in the speed during an arbitrary period. It is also possible to calculate the theoretical torque based on the actual acceleration Ar and, based on the comparison between the theoretical torque and the actual torque, determine whether the road is submerged.

Next, a road surface estimation device in a second embodiment (hereinafter also called a "second estimation device") is described below. The information providing device 21 of the first estimation device determines whether the road is submerged, based on the acceleration difference value Z that is the first parameter and the acceleration change difference value D that is the second parameter. On the other hand, an information providing device 22 of the second estimation device differs from the information providing device 21 of the first estimation device only in that the information providing device 22 uses an acceleration difference index value Iz described below as the first parameter, and an acceleration change index value Id described below as the second parameter, to determine whether the road is submerged. Therefore, the following description focuses on the difference.

The acceleration difference index value Iz(i) and the acceleration change index value Id(i) are calculated based on each of "the traveling data Dtr from the data ID "i−k−1" to "i" (that is, a predetermined number (k) of pieces of traveling data Dtr)". In the example below, the predetermined number k is 200.

More specifically, the operation unit 31 of the information providing device 22 calculates the acceleration difference index value Iz(i), corresponding to the data ID=i, based on expression (8) given below.

Expression (8)

$$Iz(i) = Z(i) \times \left[ \frac{1}{k} \times \sum_{j=0}^{k-1} \{Az(i) - Z(i-j)\}^2 \right] \quad (8)$$

where, Az(i) is the average of the acceleration difference values Z from the acceleration difference value Z(i−k−1) to acceleration difference value Z(i).

More specifically, the average Az is the average of the values of the predetermined number (k) of "acceleration difference values Z each acquired for the predetermined time $\Delta t$". That is, in this example, the average Az is the average of the acceleration difference values Z for 2 seconds (=10 milliseconds×200).

As understood from expression (8), the acceleration difference index value Iz is the product of the acceleration difference value Z and the variance (hereinafter also denoted as the variance Dz) of the acceleration difference value Z in the predetermined duration Du (two seconds in this example) (that is, Iz=Z×Dz). The variance Dz(i) becomes larger as the difference between the average Az(i) and each of the acceleration difference values Z, from the acceleration difference value Z (i−k−1) to the acceleration difference value Z(i), becomes larger. Therefore, the variance Dz becomes a large value when the acceleration difference value Z is increased suddenly in the predetermined duration Du.

On the other hand, if the vehicle 10 travels over a bump or a manhole cover, or travels in a small puddle, on the road surface (that is, the road surface condition temporarily changes) in the predetermined duration Du, the acceleration difference value Z temporarily changes. However, the difference between the variance Dz calculated in this case and the variance Dz that would be calculated if there was no temporary change in the road surface condition is relatively small.

That is, the variance Dz can be used as an index that represents the amount of increase in the acceleration difference value Z while excluding a temporary change in the road surface condition in the predetermined duration Du. This means that the acceleration difference index value Iz, which is the product of the acceleration difference value Z and the variance Dz, is increased when the acceleration difference value Z itself is large and when the acceleration difference value Z is increased suddenly in the predetermined duration Du, but is affected less by a temporary change in the road surface condition.

In addition, the operation unit 31 calculates the acceleration change index value Id(i), corresponding to the data ID=i, based on expression (9) given below.

Expression (9)

$$Id(i) = \frac{1}{k} \times \sum_{j=0}^{k-1} \{Ad(i) - D(i-j)\}^2 \quad (9)$$

where Ad(i) is the average of the acceleration change difference values D from the acceleration change difference value D(i−k−1) to the acceleration change difference value D(i).

As understood from expression (9), the acceleration change index value Id is the variance of the acceleration change difference values D in the predetermined duration Du. Therefore, as with the acceleration difference index value Iz, the acceleration change index value Id becomes a large value when the acceleration change difference value D is increased suddenly in the predetermined duration Du, but is affected less by a temporary change in the road surface condition.

The submergence determination condition used by the second estimation device is a condition that is satisfied if all conditions below are satisfied. Among those conditions, the condition (B2) below may be omitted. (A2) The acceleration difference index value Iz(i) is larger than the predetermined threshold Zth2 (that is, Iz(i)>Zth2). (B2) The acceleration change index value Id(i) is larger than the predetermined threshold Dth2 (that is, Id(i)>Dth2). (C) The vehicle 10 is traveling ahead and is accelerating.

The specific operation of the CPU, included in the operation unit 31 of the information providing device 22, is described below with reference to the flowchart in FIG. 4. For a step in the flowchart in FIG. 4 in which the processing similar to that of a step shown in the flowchart in FIG. 3 is performed, the same step number as that in FIG. 3 is used.

Figure 4:
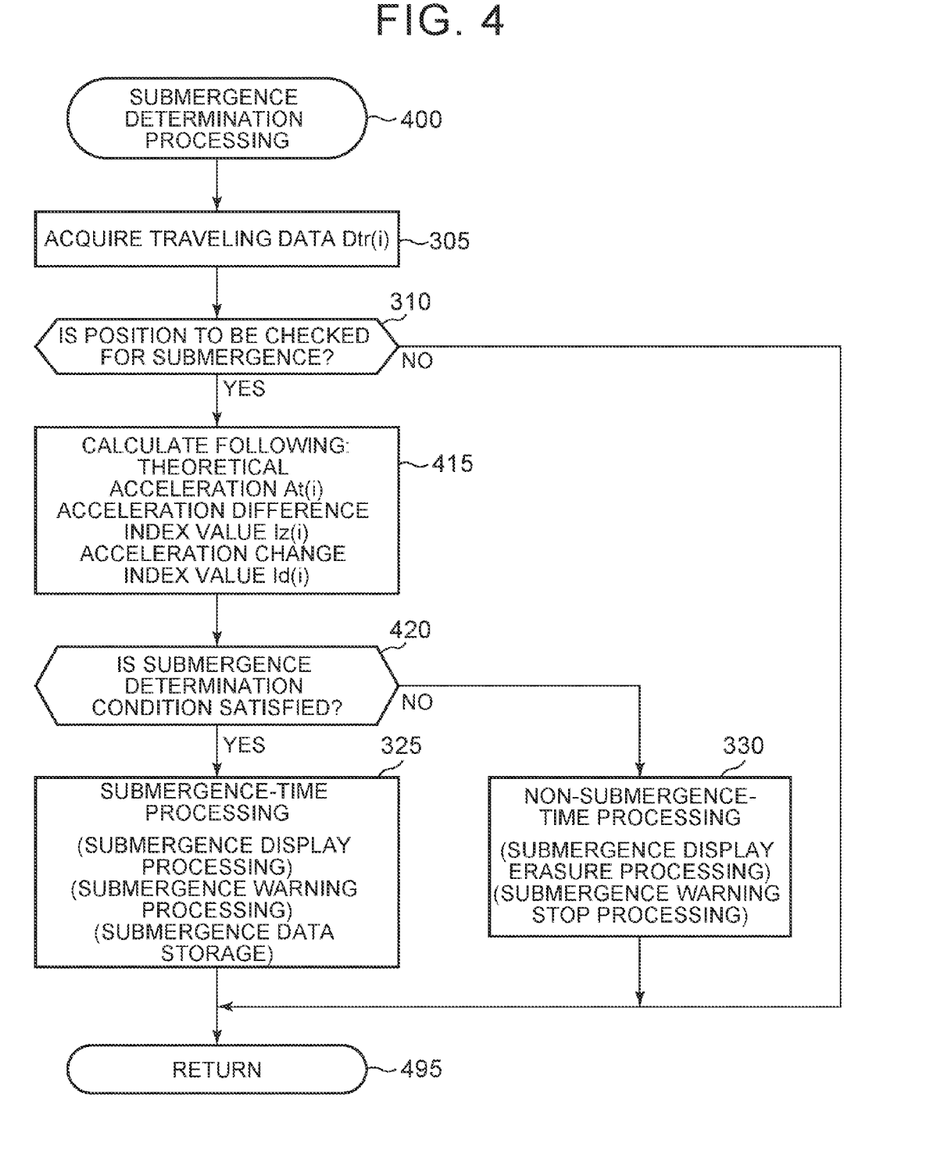
FIG. 4 is a flowchart showing the submergence determination processing routine performed by an operation unit of an information providing device that operates as a road surface submergence estimation device (second estimation device) in a second embodiment.

The CPU performs the submergence determination processing routine, shown in the flowchart in FIG. 4, each time the predetermined time Δt elapses. That is, at an appropriate time, the CPU starts the processing in step 400 and proceeds to step 305.

If the result of step 310 is Yes, the CPU proceeds to step 415. In step 415, the CPU calculates the theoretical acceleration At(i), acceleration difference index value Iz(i), and acceleration change index value Id(i) according to expressions (1), (8), and (9), respectively. Next, the CPU proceeds to step 420 and determines whether the submergence determination condition described above is satisfied.

If the submergence determination condition is satisfied, the CPU determines (estimates) that the current position Ps(i) is submerged and proceeds from step 420 to step 325 to perform the submergence-time processing. After that, the CPU proceeds to step 495 to once terminate this routine.

On the other hand, if it is determined in step 420 that the submergence determination condition is not satisfied, the CPU determines that the result of step 420 is No and proceeds to step 330 to perform the non-submergence time processing. After that, the CPU proceeds to step 495.

If the result of step 310 is No, the CPU proceeds directly to step 495.

As described above, the second estimation device (information providing device 22) is configured to calculate the product (acceleration difference index value Iz(i)) of the variance (Dz(i)) of the acceleration difference values in the predetermined duration (Du) and the current-time value of the acceleration difference value (Z(i)) (step 415) as the first parameter.

In addition, the second estimation device (information providing device 22) is configured to calculate the variance (acceleration change index value Id(i)) of the difference (acceleration change difference value D(i)) between the amount of change in the theoretical acceleration per predetermined time (Δt) and the amount of change in the actual acceleration of the vehicle per predetermined time in the predetermined duration (step 415).

Therefore, based on the acceleration difference index value Iz(i) that is the first parameter, the second estimation device determines whether the vehicle is traveling on a submerged road. In addition, based on the acceleration change index value Id(i) that is the second parameter, the second estimation device determines whether the vehicle is traveling on a submerged road. As a result, even if there is a temporary change in the road surface, the second estimation device can more accurately determine whether the vehicle 10 is traveling on a submerged road surface.

Next, a road surface submergence estimation system (hereinafter also called "this estimation system") in a third embodiment is described. The information providing device 21 in the first embodiment estimates that the traveling position (current position Ps) of the vehicle 10 is submerged if the submergence determination condition is satisfied. On the other hand, an information providing device 23 in the third embodiment estimates whether the submergence determination condition is satisfied (that is, submergence determination result) using a submergence point estimation server 60. The submergence point estimation server 60 estimates whether submergence occurs at a point on the map database based on the information received from a plurality of vehicles 10. The following description focuses on this difference.

Figure 5:
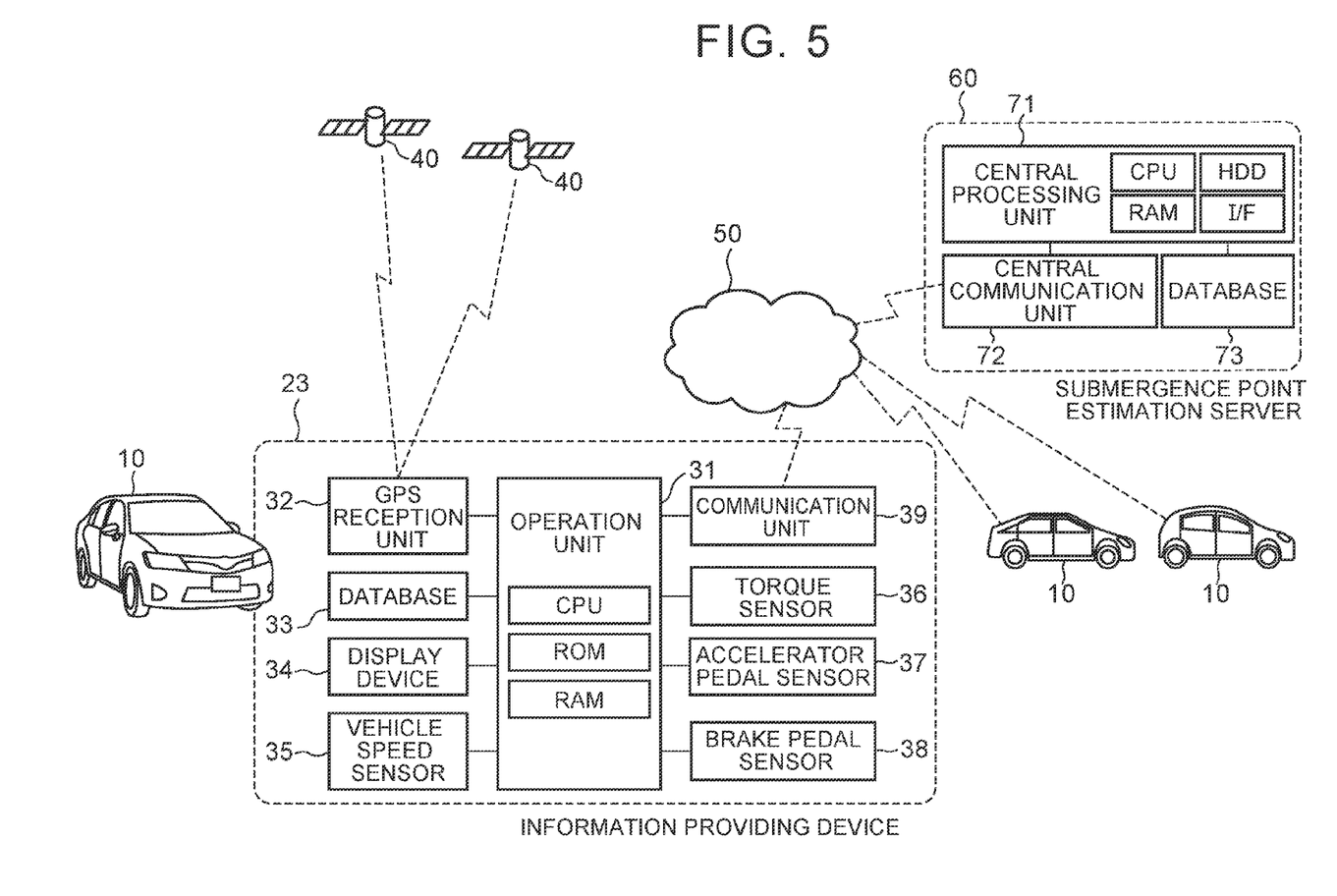
FIG. 5 is a diagram showing the outline of a road surface submergence estimation system (this estimation system) in a third embodiment.

This estimation system is implemented by the information providing device 23 that is mounted on a vehicle 10 shown in FIG. 5 and the submergence point estimation server 60 that communicates with each of the vehicles 10. Unlike the information providing device 21 in the first embodiment, the information providing device 23 in the third embodiment includes a wireless communication unit 39.

The wireless communication unit 39 carries out data communication with the submergence point estimation server 60 over a network 50. The network 50 is a known wide-area communication network including a mobile phone network (including a radio data communication network) and the Internet.

The submergence point estimation server 60 includes a central processing unit 71, a central communication unit 72, and a database 73. The central processing unit 71, an electronic circuit including a known general-purpose computer, includes a CPU, an HDD or SSD, a RAM, and an interface (I/F). The HDD or SSD of the central processing unit 71 stores programs to be executed by the CPU.

The central communication unit 72 carries out data communication with each of the vehicles 10 over the network 50. Like the database 33 in the first embodiment, the database 73 stores a map database. In addition, the database 73 stores a submergence estimation information database that is a set of submergence estimation results received from the vehicles 10 and a submergence point database that is a set of points at which the generation of submergence is estimated.

Each of the vehicles 10 determines whether the submergence determination condition described above is satisfied each time a predetermined time $\Delta t$ elapses, and sends the determination result, as well as the current position Ps that is the submergence determination position, to the submergence point estimation server 60. The central processing unit 71 adds a combination of the submergence determination result and the submergence determination position, received from each of the vehicles 10, to the submergence estimation information databases as the submergence determination result Fa.

The central processing unit 71 performs the submergence information collection processing for collecting newly-added submergence determination results Fa at a predetermined collection interval Di (15 minutes in this example). The submergence information collection processing is outlined below using a point Pa1 on a road, included in the map database stored in the database 73, as an example.

The central processing unit 71 extracts the submergence determination results Fa on the point Pa1, sent from the vehicles 10 after the last submergence information collection processing was performed, from the database 73. The central processing unit 71 calculates the ratio of the number of submergence determination results Fa (Fap) indicating that the submergence determination condition is satisfied to "the total number of extracted submergence determination results Fa (Faa)" as the submergence detection ratio (Fr) (that is, Fr=Fap/Faa). The central processing unit 71 stores, by point and by generation, the submergence detection ratios Fr in the database 73.

The latest submergence detection ratio Fr is denoted as Fr1, the submergence detection ratio Fr that is one generation older (that is, the submergence detection ratio Fr calculated when the submergence information collection processing was performed last) is denoted as Fr2, and the submergence detection ratio Fr that is two generations older is denoted as Fr3. If the relation of "submergence detection ratio Fr3<submergence detection ratio Fr2<submergence detection ratio Fr1" is satisfied, that is, if the submergence detection ratio Fr continues to increase, the central processing unit 71 determines that the point Pa1 is submerged.

After that, if the submergence detection ratio Fr on the point Pa1 is smaller than a predetermined threshold Frth (that is, Fr<Frth) when the central processing unit 71 performs the submergence information collection processing, the central processing unit 71 determines that the point Pa1 is not submerged (submergence problem is solved). If it is determined that submergence occurs at the point Pa1 or if the submergence at point Pa1 is solved, the central processing unit 71 updates the submergence point database.

The central processing unit 71 performs the submergence information collection processing also for the points, other than the point Pa1, on the roads included in the map database. In addition, the central processing unit 71 delivers the contents of the submergence point database (a set of submergence occurrence points) to each of the vehicle 10.

The operation unit 31 of the information providing device 23, provided on each of the vehicles 10, stores the received contents of the submergence point database in the database 33. The database may be stored on a storage medium such as an HDD, SSD, or flash memory device. In addition, if a submergence occurrence point is included in the route (suggested route) to the destination, the operation unit 31 acquires a detour that does not pass through the submergence point and notifies the driver about the detour as a new suggested route.

The specific operation of the CPU, included in the operation unit 31 of the information providing device 23, is described below with reference to the flowchart in FIG. 6. For a step in the flowchart in FIG. 6 in which the processing similar to that of a step shown in the flowchart in FIG. 3 is performed, the same step number as that in FIG. 3 is used.

The detailed description of the following processing, described above and performed by the information providing device 23, is omitted: "the processing to receive the submergence occurrence point information from the submergence point estimation server 60 and to store the received information in the database 33" and "the processing to notify the driver about a route that bypasses a submergence occurrence point based on the submergence occurrence point information."

Figure 6:
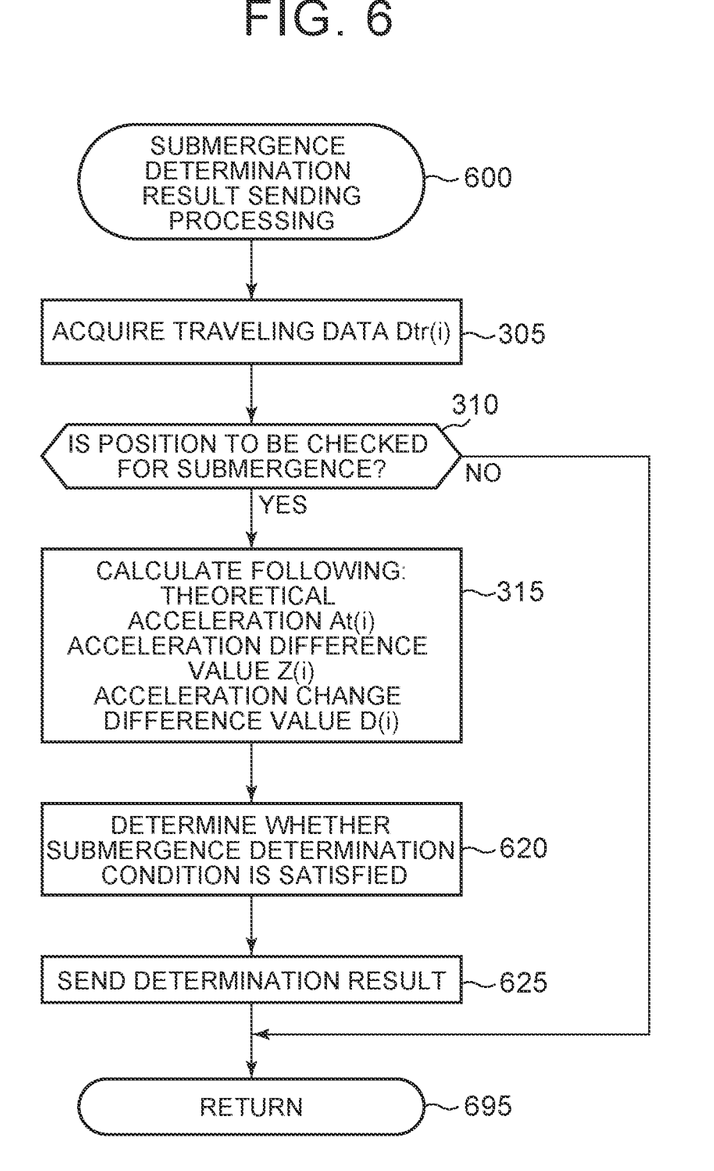
FIG. 6 is a flowchart showing the submergence determination result sending processing routine performed by an operation unit of the information providing device of this estimation system.

The CPU performs the submergence determination processing routine, shown in the flowchart in FIG. 6, each time the predetermined time $\Delta t$ elapses. That is, at an appropriate time, the CPU starts processing in step 600 and proceeds to step 305.

Figure 3:
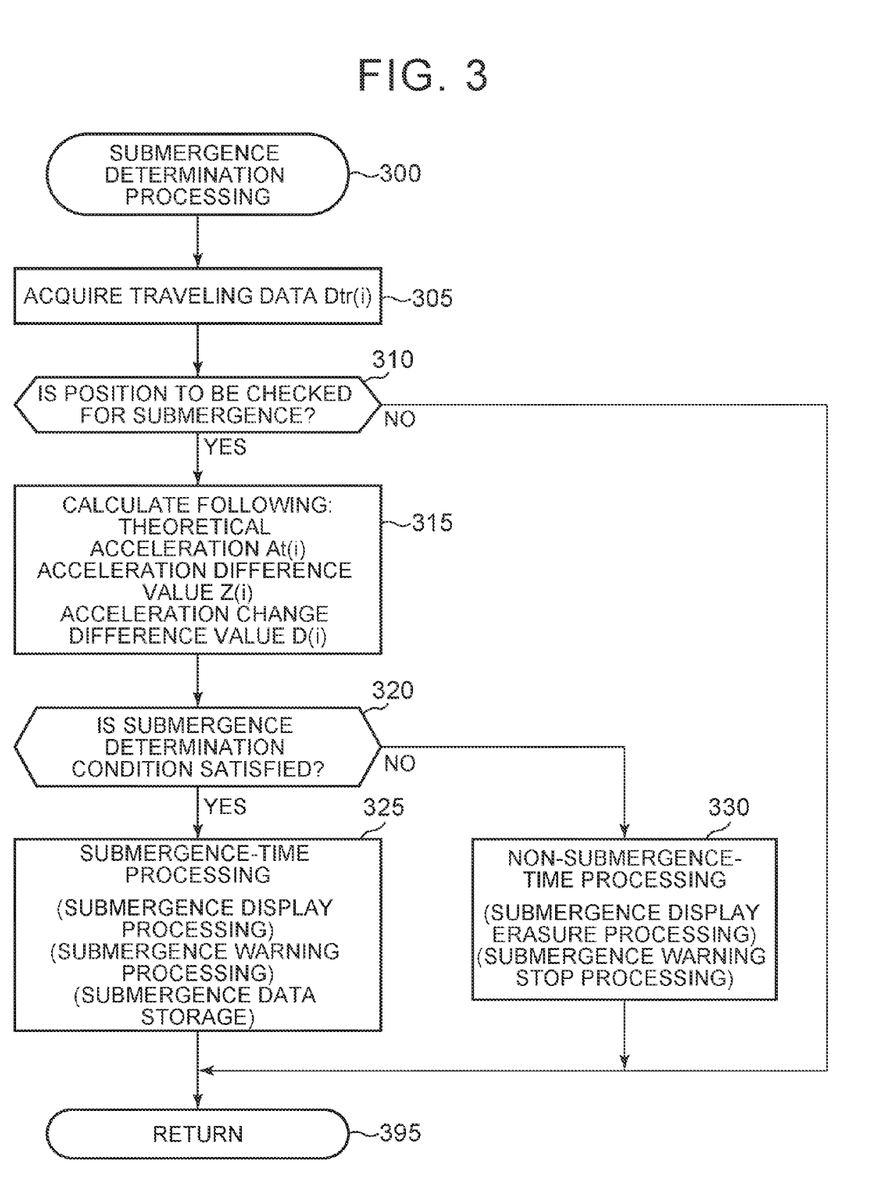
FIG. 3 is a flowchart showing the submergence determination processing routine performed by an operation unit of the first estimation device.

After performing step 315, the CPU proceeds to step 620 and performs the processing, similar to that of step 320 in FIG. 3, to determine whether the submergence determination condition is satisfied. Next, the CPU proceeds to step 625 and sends the determination result (that is, the information indicating whether the submergence determination condition is satisfied), as well as the current position Ps(i), to the submergence point estimation server 60. Next, the CPU proceeds to step 695 to once terminate this routine. On the other hand, if the result of step 310 is No, the CPU proceeds directly to step 695.

Figure 7:
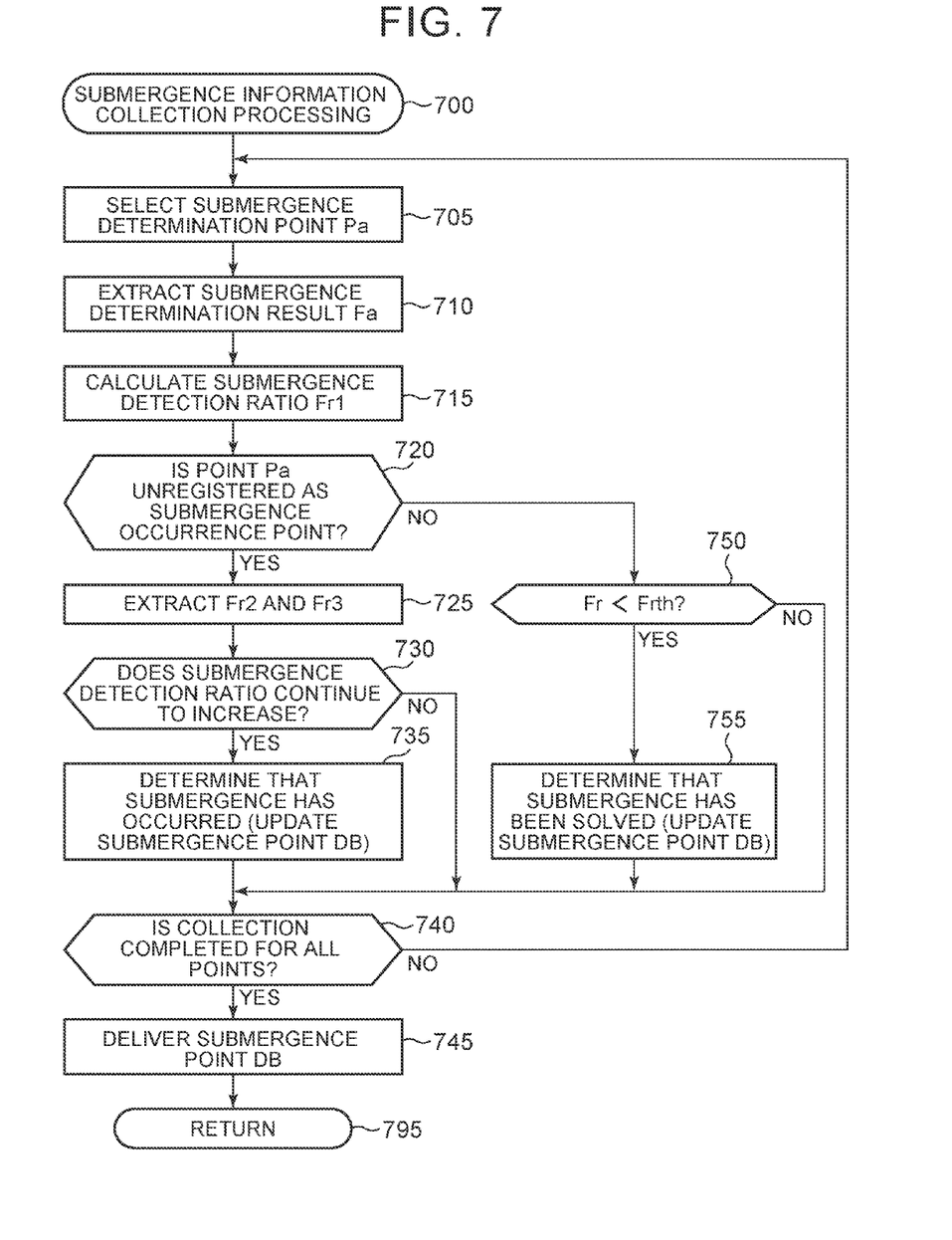
FIG. 7 is a flowchart showing the submergence information collection processing routine performed by the central processing unit of a submergence point estimation server of this estimation system.

The specific operation of the CPU included in the central processing unit 71 during the execution of the submergence information collection processing is described below with reference to the "submergence information collection processing routine" shown in the flowchart in FIG. 7. The CPU performs this routine each time the collection interval Di elapses.

That is, at an appropriate time, the CPU starts processing in step 700 and sequentially performs the processing from step 705 to step 715 described below. Step 705: The CPU extracts a point Pa, at which a check is made whether submergence occurs (submergence checking point), from the map database. Step 710: The CPU extracts the submergence determination results Fa of the submergence checking point Pa that have been added to the submergence estimation information database after this routine was executed last.

Step 715: The CPU calculates the submergence detection ratio Fr (that is, submergence detection ratio Fr1) based on the extracted submergence determination results Fa and stores the submergence detection ratio Fr, as well as the submergence checking point Pa, in the database 73.

Next, the CPU proceeds to step 720 to determine whether the submergence checking point Pa is registered in the submergence point database as a submergence occurrence point. If the submergence checking point Pa is unregistered as a submergence occurrence point, the CPU determines that the result of step 720 is Yes and proceeds to step 725 to extract the submergence detection ratio Fr2 and the submergence detection ratio Fr3 of the submergence checking point Pa from the database 73.

Next, the CPU proceeds to step 730 to determine whether the submergence detection ratio Fr continues to increase (that is, whether the relation of Fr3<Fr2<Fr1 is satisfied) based on the submergence detection ratio Fr1, submergence detection ratio Fr2, and submergence detection ratio Fr3. If the submergence detection ratio Fr continues to increase, the CPU determines that the result of step 730 is Yes and proceeds to step 735 to determine that submergence has occurred at the submergence checking point Pa. In addition, the CPU adds the submergence checking point Pa, at which it is determined that submergence has occurred, to the submergence point database. Next, the CPU proceeds to step 740.

On the other hand, if the submergence detection ratio Fr does not continue to increase, the CPU determines that the result of step 730 is No and proceeds directly to step 740.

In step 740, the CPU determines whether the submergence information collection processing has completed for all points where a determination is to be made whether submergence occurs. If the processing is completed for all the points where a determination is to be made, the CPU determines that the result of step 740 is Yes and proceeds to step 745 to deliver the updated submergence point database to the vehicles 10. Next, the CPU proceeds to step 795 to once terminate this routine.

On the other hand, if the processing is not yet completed for all points, the CPU determines that the result of step 740 is No and returns to step 705 to select another point, for which the processing is not yet completed, as the submergence checking point Pa.

On the other hand, if the submergence checking point Pa is registered in the submergence point database as a submergence occurrence point, the CPU determines that the result of step 720 is No and proceeds to step 750 to determine whether the submergence detection ratio Fr is smaller than the threshold Frth. If the submergence detection ratio Fr is smaller than the threshold Frth, the CPU determines that the result of step 750 is Yes and proceeds to step 755 to determine that submergence at the submergence checking point Pa is solved. In addition, the CPU deletes the submergence checking point Pa, where it is determined that the submergence is solved, from the submergence point database. After that, the CPU proceeds to step 740.

On the other hand, if the submergence detection ratio Fr is equal to or higher than the threshold Frth, the CPU determines that the result of step 750 is No and proceeds directly to step 740.

This estimation system makes it possible to accurately estimate the submergence occurrence condition at many points (that is, over a wide area). In addition, the information providing device of each vehicle can recognize in advance whether a submerged point is included in the traveling route and, if necessary, notify the driver about a detour that does not include a submerged point.

While the embodiments of the road surface submergence estimation device and the road surface submergence estimation system of this disclosure have been described, it is to be understood that the disclosure is not limited to the specific embodiments above, but that various changes may be added without departing from the purpose of the disclosure. For example, the information providing device in the first embodiment and the second embodiment provide the route guidance function that guides the driver of the vehicle 10 along a suggested route. However, the information providing devices need not always provide the route guidance function. Additionally, the estimation processor may determine the submergence condition based on variables such as acceleration and torque as well as timing measurements, constants, statistical measures, or scaling factors in order to average the measured variables or calculate a weighted or converted value.

In addition, the information providing device in each embodiment may acquire the real torque Tq using the torque sensor 36. However, the information providing device may acquire the real torque Tq using a different method. For example, the information providing device may acquire the real torque Tq based on the amount of air taken into the driving source (engine) of the vehicle 10 and "the amount of fuel injected into the intake air.

In addition, the information providing device in each embodiment may acquire the real acceleration Ar based on the vehicle speed Vs. Alternatively, the information providing device may provide an acceleration sensor and acquire the real acceleration Ar based on the output of the acceleration sensor.

In addition, the information providing device in each embodiment may acquire the current position Ps based on the signal from the GPS satellite 40. However, the information providing device may also acquire the current position Ps not only from the signal from GPS satellite 40 but also using the vehicle speed Vs. That is, the information providing device may correct the current position Ps, calculated based on the signal from the GPS satellite 40, based on the vehicle speed Vs.

In addition, the information providing device in each embodiment may include the condition (C) in the submergence determination condition. However, the information providing device may omit the condition (C) entirely from the submergence determination condition. Alternatively, the information providing device may omit a part of the condition (c1) to the condition (c5) included in the condition (C). In addition, in place of the condition (c3), the information providing device may utilize a condition (c3'), as part of the submergence determination condition. Condition (c3') is a condition whereby the stop lamp of the vehicle 10 is not turned on.

In addition, the information providing device in each embodiment may determine whether the submergence determination condition is satisfied. However, the information providing device may send the traveling data Dtr(i) to the server, connected via data communication, to cause the server to determine whether the submergence determination condition is satisfied. That is, a part of the calculation processing performed by the information providing device may be performed by the server.

In addition, the information providing device 23 in the third embodiment uses the submergence determination condition based on the acceleration difference value Z and the acceleration change difference value D as in the first embodiment. However, the information providing device 23 may use the submergence determination condition based on the acceleration difference index value Iz and the acceleration change index value Id as in the second embodiment.

In addition, the submergence point estimation server 60 in the third embodiment estimates that the submergence checking point Pa is submerged if the submergence detection ratio Fr continues to increase (that is, the relation of Fr3<Fr2<Fr1 is satisfied). However, the submergence point estimation server 60 may estimate that the submergence checking point Pa is submerged if the submergence detection ratio Fr1 is larger than a predetermined threshold Frth0.

What is claimed is:

1. A road surface submergence estimation device comprising:
    a motion sensor configured to acquire an actual acceleration of a vehicle;
    a torque acquisition sensor configured to acquire an actual torque transmitted from a driving source to wheels of the vehicle, the driving source being mounted in the vehicle; and
    an estimation processor configured to determine whether a predetermined submergence determination condition is satisfied using the actual acceleration and the actual torque, and when it is determined that the submergence determination condition is satisfied, estimates that a road surface on which the vehicle is traveling is submerged,
    wherein the estimation processor is also configured to determine that the submergence determination condition is satisfied at least when a first condition that a first parameter is larger than a first threshold is satisfied, the first parameter being a parameter that becomes larger as a difference between a first variable and a second variable becomes larger, the first variable being a variable that becomes larger as the actual acceleration becomes larger, and the second variable being a variable that becomes larger as an actual torque becomes larger.

2. The road surface submergence estimation device according to claim 1, wherein
    the first variable is the actual acceleration, and
    the second variable is a theoretical acceleration that is an acceleration of the vehicle when the vehicle is traveling on a non-submerged, flat road surface, wherein the theoretical acceleration is calculated based on the actual torque.

3. The road surface submergence estimation device according to claim 2, wherein
    the first parameter is an acceleration difference value that is a difference between the theoretical acceleration and the actual acceleration.

4. The road surface submergence estimation device according to claim 2, wherein
    the first parameter is a product of a variance of acceleration difference values in a first predetermined duration and a current-time value of the acceleration difference values, the acceleration difference values being a difference between the theoretical acceleration and the actual acceleration.

5. The road surface submergence estimation device according to claim 2, wherein
    the estimation processor is configured to determine that the submergence determination condition is satisfied when the first condition and a second condition that a second parameter is larger than a predetermined second threshold are satisfied, the second parameter being a parameter that becomes larger as a difference between an amount of change in the theoretical acceleration per predetermined time and an amount of change in the actual acceleration per the predetermined time becomes larger.

6. The road surface submergence estimation device according to claim 5, wherein
    the second parameter is a difference between an amount of change in the theoretical acceleration per the predetermined time and an amount of change in the actual acceleration of the vehicle per the predetermined time.

7. The road surface submergence estimation device according to claim 5, wherein
    the second parameter is a variance of differences, in a second predetermined duration, between an amount of change in the theoretical acceleration per the predetermined time and an amount of change in the actual acceleration of the vehicle per the predetermined time.

8. The road surface submergence estimation device according to claim 1, further comprising a display configured to display that a road surface on which the vehicle travels is submerged.

9. The road surface submergence estimation device according to claim 1, further comprising a speaker configured to audibly indicate that a road surface on which the vehicle travels is submerged.

10. The road surface submergence estimation device according to claim 1, wherein the estimation processor is configured to calculate a detour route if a submergence occurrence point is detected.

* * * * *